United States Patent [19]
Isermann

[11] 3,782,817
[45] Jan. 1, 1974

[54] PHOTO PRINTING MACHINE

[75] Inventor: Heinrich Isermann, Siegen, Germany

[73] Assignee: Meteor-Siegen Apparatebau Paul Schmeck GmbH, Siegen, Germany

[22] Filed: Apr. 6, 1972

[21] Appl. No.: 241,565

[30] Foreign Application Priority Data
Apr. 23, 1971 Germany.................. P 21 19 871.0

[52] U.S. Cl. .................................................. 355/83
[51] Int. Cl. .......................................... G03b 21/14
[58] Field of Search .................... 355/88, 38, 68, 83

[56] References Cited
UNITED STATES PATENTS
2,272,646  2/1942  Schmidt................................ 355/88
3,090,289  5/1963  Gundelfinger...................... 355/88
3,075,432  1/1963  Myers.............................. 355/88 X Primary Examiner—John M. Horan
Attorney—Olson, Trexler et al.

[57] ABSTRACT

A photo-printing machine for printing from transparencies onto paper has a photo-sensitive means to measure the light transmitted by a transparency. A plurality of filter elements each with a different spectral transmission characteristic is positioned between the light source and the transparency. Each filter is provided with a diaphragm to control the amount of light transmitted thereby.

3 Claims, 1 Drawing Figure

PATENTED JAN 1 1974 3,782,817
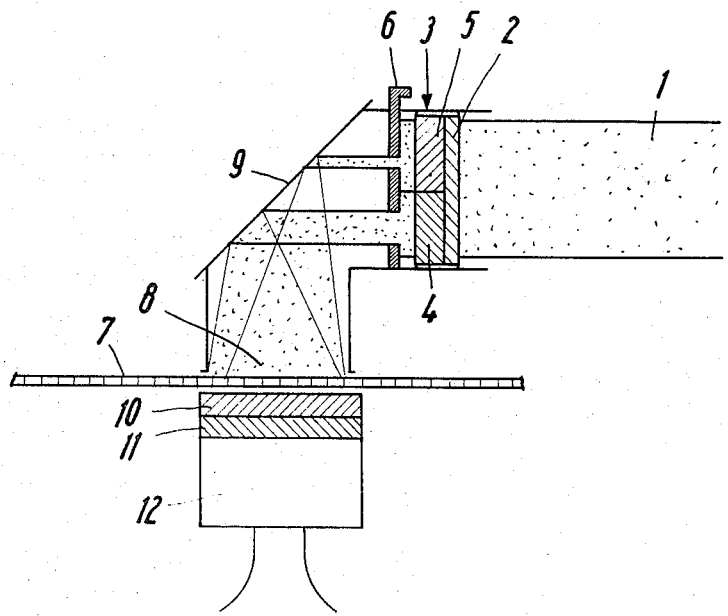

PHOTO PRINTING MACHINE

The invention relates to a transparency measuring system for a photo-printing machine. The system is of the type in which, for measuring the transparency of an original to be reproduced, measuring light from a light source is altered by the aid of a filter, taking into account the spectral sensitivity of the photo-printing paper, and is guided through the original to a photo-sensitive device. At the exposure station of the photo-printing machine the photo-printing paper is exposed according to the particular degree of transparency measured by the system.

An original inserted for reproduction in the photo-printing machine passes through a measuring station, which incorporates the transparency measuring system and in which it attenuates, in accordance with its permeability to light, the light encountering it. The electrical signals emitted from the photo-sensitive device represent the extent to which the measuring light is attenuated by the original and are used in the photo-printing machine for automatically determining the correct exposure time for the photo-printing paper.

The amplitude of these electrical signals is greatly dependent on the wave length of the measuring light received. As this spectral sensitivity of the photo-cell generally is different from that of the photo-printing papers, accurate exposure control involves, in practice, considerable problems arising out of the necessity of adapting the sensitivity of the photo-sensitive device to that of the particular photo-printing paper used.

This adaption has hitherto been carried out, as mentioned, for example, in German Pat. specification No. 1,522,790, by providing in the path of the measuring light a filter designed for a wave length range adapted to the photo-printing paper. This system, however, does not make it possible, within the spectral sensitivity range common to the photo-sensitive device and the paper, to alter the spectral composition of the measuring light in such a way that as a result, to express it in simple terms, the photo-sensitive device, together with the filter, "feels" the light in the same way as the paper does.

Neither is it sufficient to adapt the spectral sensitivity of the photo-cell to a particular variety of photo-printing paper, because in modern photo-printing machines more than one such variety is used; there are a number of types of paper in readiness in the photo-printing machine, such as standard paper and high-speed paper. The individual types of paper differ in their spectral sensitivity so greatly that the adaptation of the spectral sensitivity of the photo-sensitive device has to be altered. Hitherto attempts have been made to replace this alteration by changing the operating voltage of the photo-cell, photo-resistor or the like forming the photo-sensitive device. The photo-printing papers exposed with this device, however, were found to have suffered a change in the basic shade, with blackening occurring even at the points at which the original was at its most transparent. The main cause of this displacement in the grey value of the copies is the fact that the maximum spectral sensitivity of the other type of printing paper occurs at a different wave length from that to which the photo-sensitive device has been adapted by the filtering of the measuring light.

A transparency measuring system for a photo-printing machine comprises, according to this invention, a light source, photo-sensitive means, an original being interposed between the light source and the photo-sensitive means in order to measure its transparency value, a filter which is adapted to be located between the light source and the original, and which has a number of separate filter elements arranged side by side and each with a different spectral permeability, and, for each filter element, separate, independently selectable, means for adjusting the response of the photo-sensitive means to light through the filter element.

The adaption of the sensitivity of the system is thus carried out, both as regards the wave length of the measuring light and also as regards the intensity distribution, by a system in which each beam of measuring light passing through a particular individual filter element is adapted, as regards its radiation density in proportion to the other beams of light, to the printing paper sensitivity corresponding to the relevant wave length. If the spectral sensitivity has to be altered by changing the type of printing paper used, the intensity adaption stage can be varied for each beam of measuring light in such a way that the radiation densities of the individual beams correspond to the altered spectral sensitivity of the other type of printing paper. The measurement of the original to be reproduced being thus in all cases spectrally correct, the exposure time obtained will invariably be that required for the type of photo-printing paper used, so that the quality of the blue-prints will be satisfactory and constant.

The adjusting means for the individual beams of light are advantageously constituted by diaphragms of different aperture, situated between the individual filter elements and the photo-sensitive means and in the path of the measuring light. With a fixed filter combination the spectral sensitivity of the measuring device can then be adapted to a different sensitivity of a different kind of photo-printing paper, by exchanging one diaphragm combination for another with a different aperture distribution for the individual beams of measuring light.

As the originals to be reproduced differ considerably in their dispersion cones, they are preferably provided, on the side facing towards the photo-sensitive means, with a diffusion disc with a defined forward dispersion, relatively great in relation to the original dispersions and thus reducing the influence of this latter.

Furthermore, many types of paper for the original show a tendency for fluorescence, which may noticeably contribute to a falsification of the measuring result. It is therefore advisable to provide an edge filter in front of the photo-sensitive means, in order to cut out the fluorescent light.

The invention will be more readily understood by way of example from the following description of a transparency measuring system for a photo-printing machine, reference being made to the accompanying drawing which illustrates the system.

The beam of measuring light 1, diverted from the photo-printing light source of the photo-printing machine, is divided up, after passing through a heat protection filter 2 (e.g. a glass plate), in a filter 3 consisting of the individual filter elements 4 and 5, into individual beams of measuring light with different spectral ranges. It is of advantage to provide a sufficient number of individual filter elements 4, 5, situated side by side, to ensure that, for the maximum sensitivity of each type of photo-printing paper used, the filter elements give passage to at least one spectral range. If, for example, the photo-printing light source used consists of a high pressure mercury vapour lamp, three adjacent filter elements for the wave length ranges 365 nm, 405 nm and 436 nm are provided for operation with standard and high-speed photo-printing papers.

The beams of measuring light formed by the individual filters pass through an intensity adaptation stage 6. In this latter, by means of diaphragm apertures of different size, each beam of measuring light is narrowed down to a cross section adapted to the spectral sensitivity of the particular photo-printing paper used.

When one type of paper is replaced by another the intensity adaptation stage constructed as a diaphragm disc with a number of apertures associated with the respective separate filters can be replaced by a second diaphragm disc with different aperture ratios for the individual beams of measuring light. It is of advantage for the sets of diaphragm apertures to be situated side by side in the diaphragm disc and for a remote-controlled flap or similar device to be provided in order to ensure that only one set of diaphragm apertures at a time is moved into the path of the measuring light. The operation of switching over the flap and thus the set of diaphragms can then be combined with the selection of the type of photo-printing paper.

A deflecting mirror 9 guides the spectrally adapted measuring light to the measuring point 8, in which it passes through the original 7 to be produced. Via a diffuser disc 10, situated immediately behind the original, and via an edge filter 11, serving to remove any undesirable fluorescent light out of the original, the measuring light enters photo-sensitive means 12. Any photoelectric cell, photo-conductive cell or the like may be employed.

It will be appreciated that the diaphragm 6 forms intensity adaption means for adjusting the response of the photo-sensitive means to the various light beams passing through the filter elements. Alternative means may however be provided; thus the intensity adaptation means may be situated in front of the filter. In this case, the adaptation of the intensity ratios of the individual beams of light, instead of being carried out by means of diaphragm apertures of different size can be effected by moving media of different absorptive capacity into the path of the light of the individual beams.

Also, the intensity adaption means may alternatively consist of a number of photo-cells, each associated with a spectral range filtered out by the filter elements, the output signals being adjustable selectively, and independently of one another, by means of variable resistors.

I claim:

1. A transparency system for a photo-printing machine comprising a light source, photo-sensitive means, an original being interposed between the light source and the photo-sensitive means in order to measure its transparency value, said photo-sensitive means receiving light immediately after passing through said original and originating only from said light source, a filter which is adapted to be located between the light source and the original, and which has a number of separate filter elements arranged side by side and each with a different spectral permeability, and, a unitary adaptation plate having a plurality of apertures of preselected size formed therein, each aperture being in registry with a selected one of each filter element for adjusting the response of the photo-sensitive means to the independent light spectrums which pass through associated ones of the filter elements.

2. A transparency measuring system according to claim 1 in which a diffuser disc is provided in front of the photo-sensitive means.

3. A transparency measuring system according to claim 1 in which an edge filter is provided in front of the photo-sensitive means.

* * * * *